(No Model.) 5 Sheets—Sheet 1.

S. H. POMEROY & A. M. WHITE.
REGISTER AND RECORDER FOR REVOLVING SHAFTS.

No. 460,886. Patented Oct. 6, 1891.

(No Model.) 5 Sheets—Sheet 2.

S. H. POMEROY & A. M. WHITE.
REGISTER AND RECORDER FOR REVOLVING SHAFTS.

No. 460,886. Patented Oct. 6, 1891.

WITNESSES:

INVENTORS:

(No Model.) 5 Sheets—Sheet 3.
S. H. POMEROY & A. M. WHITE.
REGISTER AND RECORDER FOR REVOLVING SHAFTS.
No. 460,886. Patented Oct. 6, 1891.
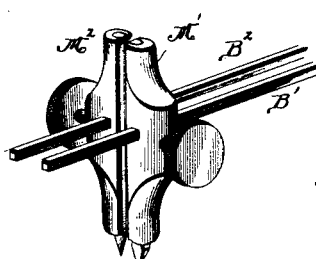
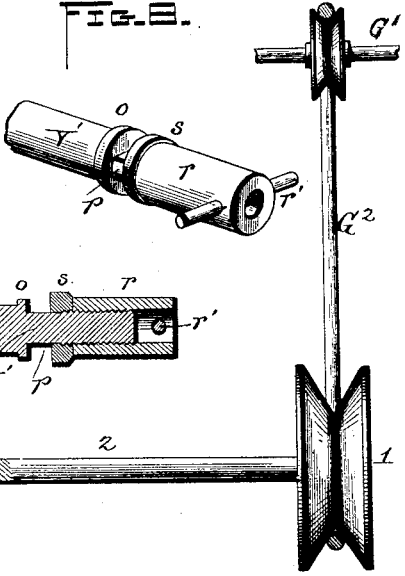
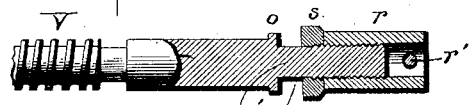
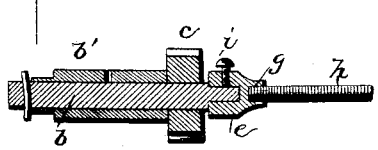
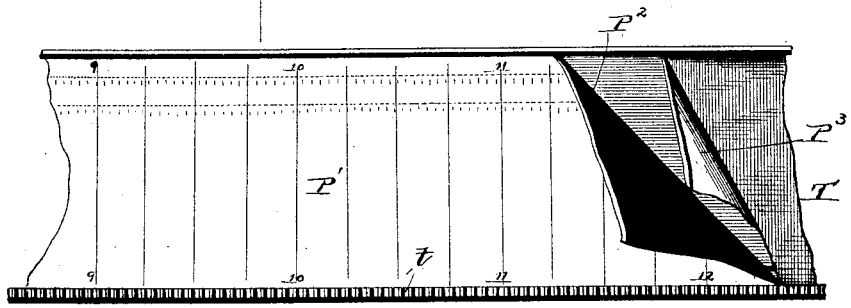
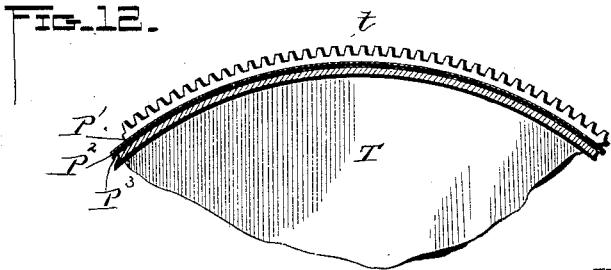
WITNESSES:
INVENTORS:

(No Model.) 5 Sheets—Sheet 4.

S. H. POMEROY & A. M. WHITE.
REGISTER AND RECORDER FOR REVOLVING SHAFTS.

No. 460,886. Patented Oct. 6, 1891.

WITNESSES:
F. L. Ouraud
J. O. L. Coombs

INVENTORS:
Silas H. Pomeroy
Albert M. White
by Louis Bagger & Co.
Attorneys.

THE NORRIS PETERS CO., PHOTO-LITHO., WASHINGTON, D. C.

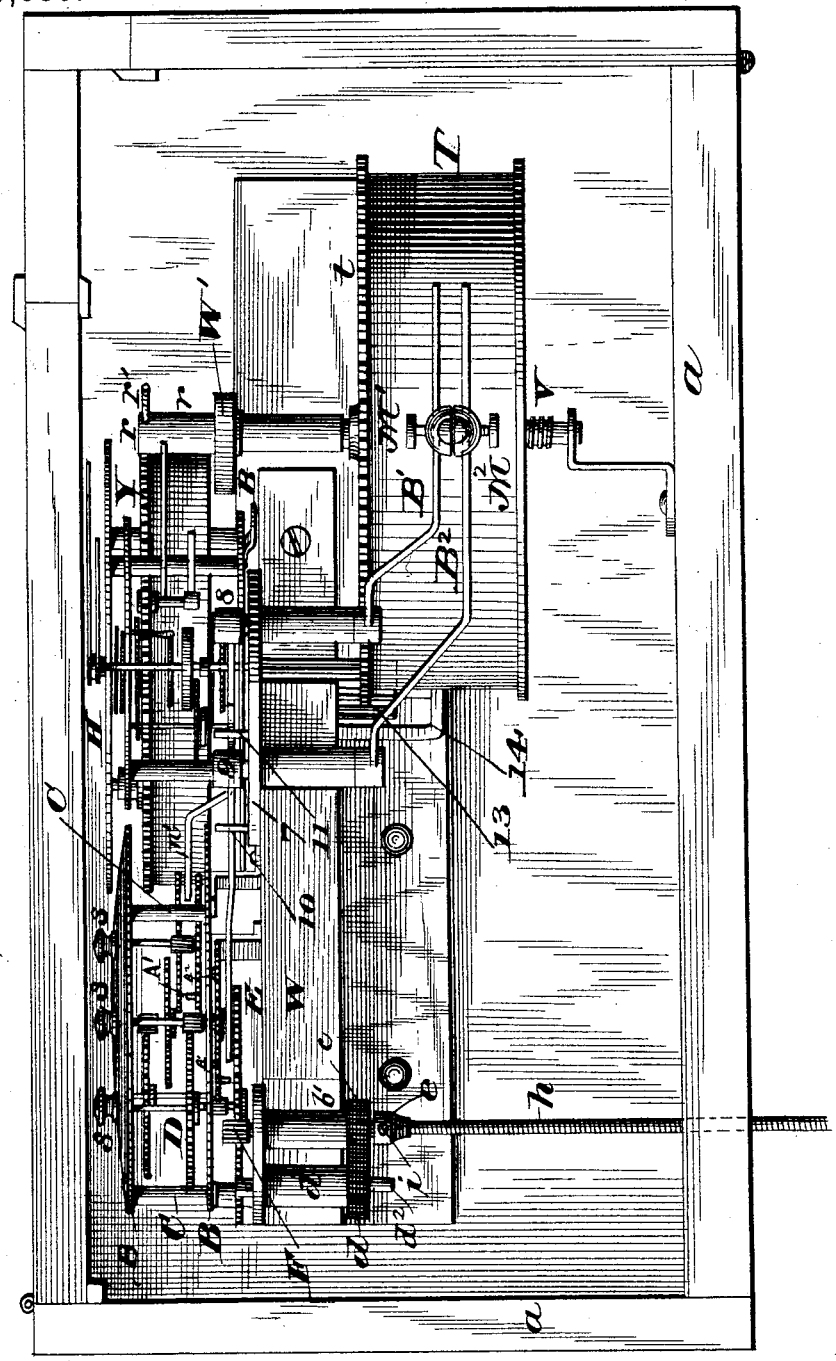

UNITED STATES PATENT OFFICE.

SILAS H. POMEROY, OF PITTSFIELD, MASSACHUSETTS, AND ALBERT M. WHITE, OF WATERBURY, CONNECTICUT, ASSIGNORS TO THE SPEED REGISTERING COMPANY, OF CHICAGO, ILLINOIS.

REGISTER AND RECORDER FOR REVOLVING SHAFTS.

SPECIFICATION forming part of Letters Patent No. 460,886, dated October 6, 1891.

Application filed October 8, 1890. Serial No. 367,407. (No model.)

*To all whom it may concern:*

Be it known that we, SILAS H. POMEROY, of Pittsfield, in the county of Berkshire and State of Massachusetts, and ALBERT M. WHITE, of Waterbury, in the county of New Haven and State of Connecticut, have invented certain new and useful Improvements in Registers and Recorders for Revolving Shafts; and we do hereby declare that the following is a full, clear, and exact description of the invention, which will enable others skilled in the art to which it appertains to make and use the same, reference being had to the accompanying drawings, which form a part of this specification, and in which—

Figure 1:
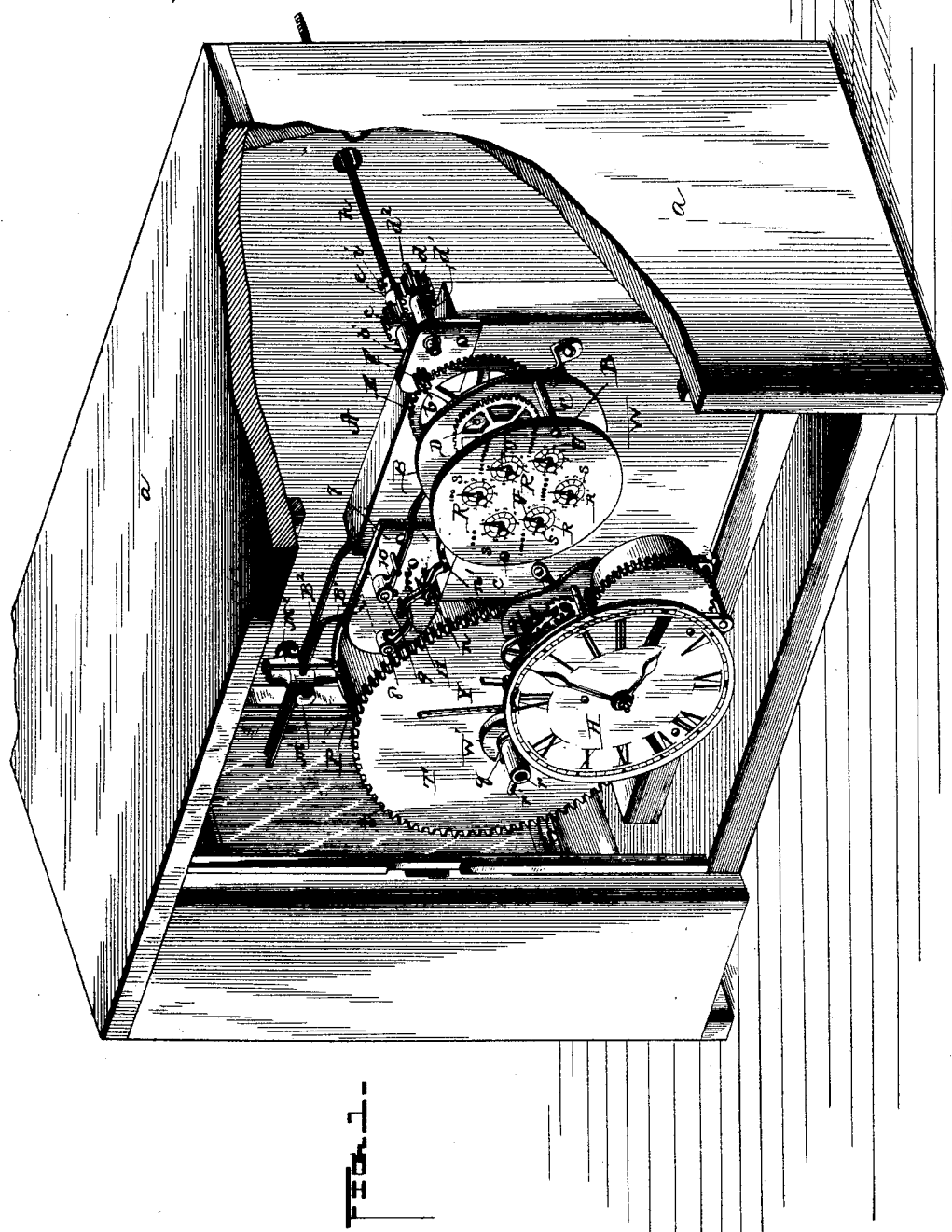
Figure 2:
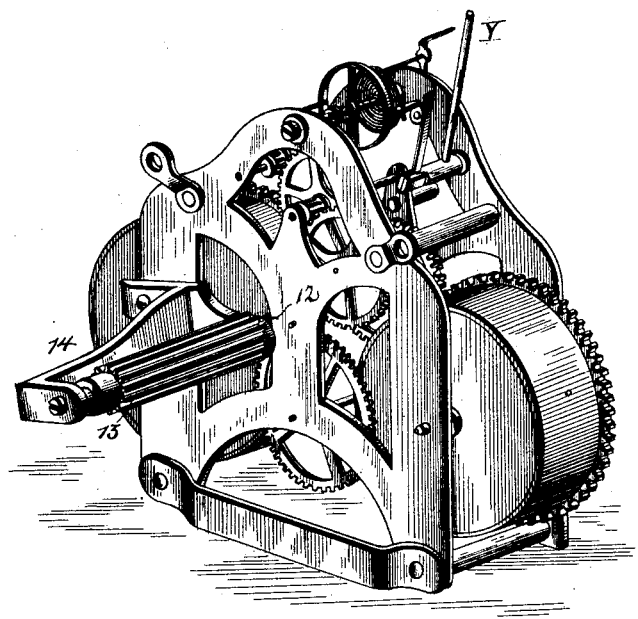
Figure 4:
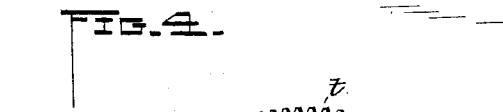
Figure 3:
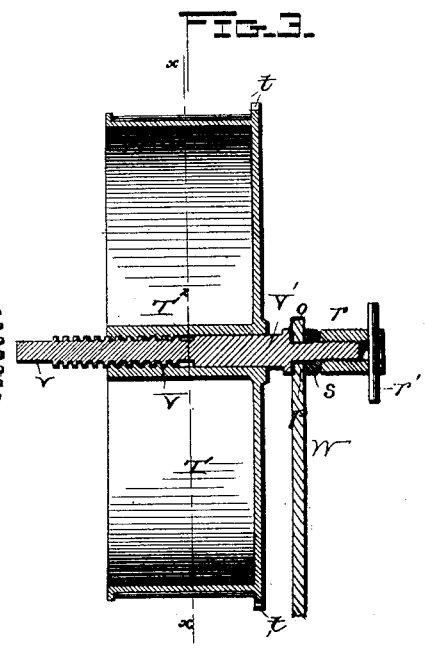
Figure 10:
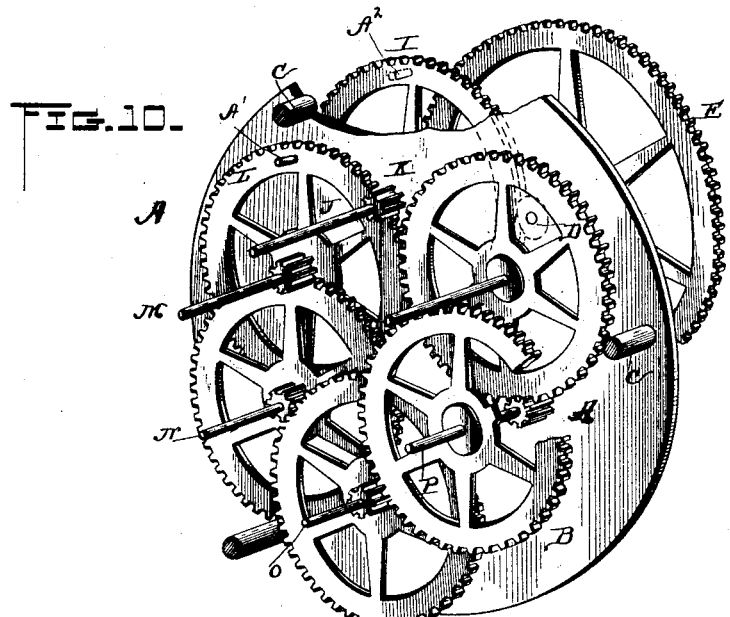
Figures 7, 13:
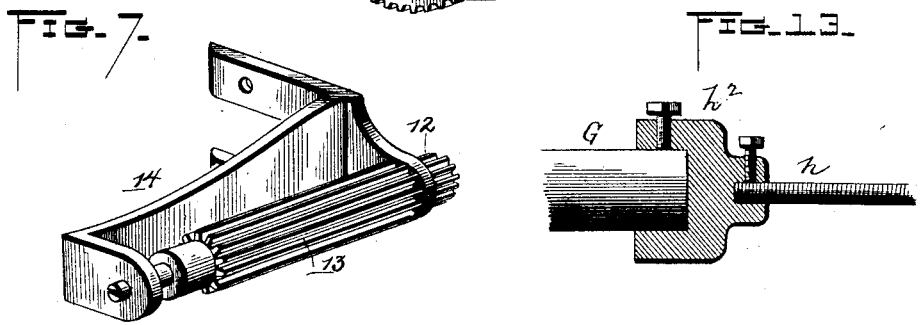
Figure 14:
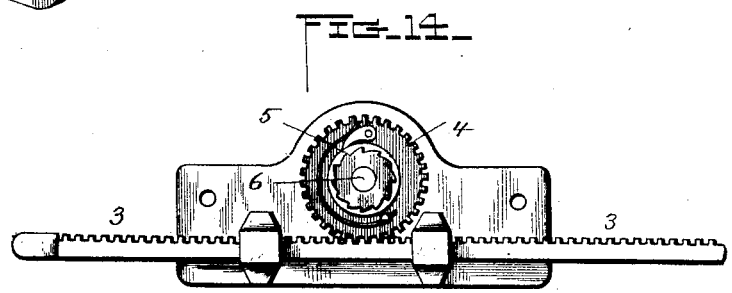

Figure 1 is a perspective view of our improved apparatus for measuring, registering, and recording the speed of revolving shafts and noting irregularities and stoppages in the revolutions, the door of the inclosing box or casing having been removed. Fig. 2 is a perspective rear view of the clock mechanism and its pinion for operating the registering device. Fig. 3 is a vertical sectional view through the axis of the recording drum or cylinder and its shaft. Fig. 4 is a vertical sectional view on line 4 4 in Fig. 3 or at right angles to the axis of the recording-drum and the axis of its operating clock-pinion. Fig. 5 is a perspective detail view of the outer ends of the recording-lever and their markers. Fig. 6 is a sectional detail view of one of the sockets and pinion-shaft, which receives the inner end of the flexible shaft coupling or connection, showing also one way of connecting the flexible shaft to the main drive-shaft. Fig. 7 is a detail view of the clock-pinion, which actuates the recording-drum and its frame. Fig. 8 is a detail view of the outer end of the screw-threaded fixed drum-shaft and its cap. Fig. 9 is a longitudinal sectional view through the same. Fig. 10 is a detail view, in perspective, of the mechanism for registering the number of revolutions of the shaft in a given time. Fig. 11 is a plan view of a portion of our improved recording-strip for permanently recording the number of revolutions of the shaft and also stoppages and irregularities in the revolutions, and Fig. 12 is a sectional view of a portion of the drum. Fig. 13 is a detail view of one of the couplings for connecting a revolving shaft to the registering apparatus, and Fig. 14 is a similar view of another coupling device designed to be applied when it is desired to register slow speed. Fig. 15 is a horizontal section of the apparatus.

Like letters and numerals of reference denote corresponding parts in all the figures.

This invention relates to devices or apparatus for measuring, registering, and permanently recording the revolutions of a shaft running any kind of machinery in mills, manufacturing establishments, pumping-houses, and elsewhere where evenness of speed is of importance, at the same time noting the exact time of day and day of the week when the stoppages or irregularities occur and making a permanent and easily-understood and accessible record of such occurrences.

With these ends in view our invention consists in certain improvements upon the registering and recording device described and claimed in the Letters Patent of the United States to Solon M. Terry, No. 384,479, bearing date of June 12, 1888, having for their object to simplify and increase the efficiency of the apparatus, which said improvements will be hereinafter more fully set forth.

Reference being had to the accompanying four sheets of drawings, the letter A designates that part of the device which relates to the registering of the number of revolutions of the shaft, and which in its general features does not differ materially from the same device as described in Patent No. 384,479—that is to say, it consists of a front and a back plate B B, connected by short pillars C, parallel to each other and suitably fastened upon a fixed support or bearing W, arranged inside of the box or casing *a*, which contains the entire apparatus. In these plates is journaled transversely a shaft D, the rear end of which extends back of the rear plate B and has rigidly secured upon it a large toothed wheel E, intermeshing with a pinion F, which is connected or coupled to the end of a short shaft $b$, which through the intermediary of a flexible shaft $h$ is connected with the drive-shaft G in the manner hereinafter described, so that said pinion will revolve with the drive-shaft and at exactly the same rate of speed. It follows that the cog-wheel E will also revolve, and at a rate of speed depending upon the number of teeth upon it and the intermeshing pinion F. In practice, for example, the pinion F may have twelve teeth or cogs and the large cog-wheel E one hundred and twenty, or pinion F may have ten teeth and cog-wheel E one hundred, which will produce the same result. Ten revolutions of shaft G and pinion F will therefore cause wheel E to revolve once. Shaft D, upon which wheel E is fastened, is also provided with a pinion H, the teeth of which engage or mesh with the teeth of a cog-wheel I, which is rigidly secured upon a shaft J, journaled, like shaft D, in the bearing-plates B B, and provided with a pinion K, which in turn meshes with a cog-wheel L on a third shaft M, also journaled in plates B B, and three (or more or less) other shafts (designated, respectively, by the reference-letters N, O, and P) are similarly journaled in said bearing-plates B B, each one of said shafts being provided between its bearings or journals in the plates with a pinion and cog-wheel, which intermesh with one another in the manner described, so that the first shaft turns the second, the second turns the third, the third turns the fourth, and so on to the end of the series of shafts, which are six in number in the present instance. The outer ends of these several shafts project through their journals or bearings in the front plate B, said projecting outer ends being tapered to adapt them to receive each a tightly-fitting detachable cap $s$, having a central tapering recess fitting the taper of the projecting end of its appropriate shaft. Each of these caps $s$ has fastened to its inner side a hand or pointer U, which when the cap is placed in position upon its shaft will point against graduated marks on a dial R, marked off upon the dial-plate or face-plate which covers the front plate B. These indicator-dials R are graduated and marked so as to indicate, (in the present illustration of our invention,) respectively, one hundred, one thousand, ten thousand, one hundred thousand, one million, and ten million revolutions of the pinion F, which, as we have seen, is connected to or coupled with the main drive-shaft G, and in the following manner: Pinion F is secured upon the outer end of a short shaft $b$, (see Fig. 1,) which is journaled in a bearing $b'$, fastened to and projecting rearwardly from a plate or bracket secured in the support W. Fastened upon the other end of the short shaft $b$ is another pinion $c$, meshing with a third pinion $d$, of the same size and number of cogs, which, like its intermeshing pinion $c$, is fastened at the outer end of a short shaft $d^2$, which is journaled in a box or bearing $d'$, parallel to the bearing $b'$. Thus it will be seen that the three pinions F, $c$, and $d$ will move in unison, the intermeshing pinions $c$ and $d$ revolving at exactly the same speed, but in opposite directions.

The letter $e$ denotes a socket-piece adapted to be attached to either of the shafts $b$ or $d^2$, and is provided with a binding-screw $i$ for holding it in place thereon. A flexible shaft $h$ engages by its end $g$ with the socket-piece $e$, said shaft being connected with the drive-shaft either directly by a cap or collar $h^2$, fitted over the end of the shaft, as illustrated in Fig. 13, or by means of a flanged pulley upon a short rigid shaft 2, which is coupled to the end of the flexible shaft and connected with a corresponding pulley on the main drive-shaft G by means of a belt $G^2$, made of rubber or other suitable elastic material, as illustrated in Fig. 6.

Again, where the shaft revolves at a comparatively slow speed—as, for example, in a pumping-engine—the device illustrated in Fig. 14 may be employed with advantage. This last-named device is simply a mechanism for converting reciprocating into rotary motion, the cogged bar 3 being fastened to one of the reciprocating arms of the engine whose speed is to be measured and registered, so as to engage on its up and down strokes a cog-wheel 4, having the usual pawl-and-ratchet device 5, whereby an intermittent revolving motion is imparted to the coupling or connection 6, (which may be flexible or otherwise,) which connects the device with the main registering-pinion F (through the intermediate pinions $c$ and $d$) and revolves the same. Other devices may be adopted for connecting the apparatus to the main drive-shaft, as convenience and expediency in any given case may direct, without departing from the spirit of our invention.

Whether the shaft the speed of which is to be measured and registered is to be coupled to the intermediate pinion $c$ or to its mate $d$ will depend upon the direction in which it revolves. Thus if (as in the present illustration of our invention) the shaft revolves from right to left it should be coupled to the intermediate pinion $c$ in order to cause pinion F and its intermeshing cog-wheel E, which operates the registering mechanism, to revolve in the opposite direction; but if, on the other hand, the main shaft revolves from left to right then it should be coupled or connected to pinion $d$ in order to provide for the proper operation of the registering mechanism A. Thus it will be seen that this mechanism or device enables a person to read off at any moment and simply by a glance upon the dials the exact number of revolutions made by the shaft in a given time, and when the machinery is stopped at the end of a day's (or week's) work all that is necessary after reading off the number of revolutions made by the shaft is to readjust the several hands or pointers U upon their respective dials by slipping the caps S off of their respective tapering shafts and again fasten them upon the same with the hands pointing to zero. The device is then in readiness to register another day's (or week's) work.

We shall now proceed to describe as next in order our improved mechanism for permanently recording any irregularities or stoppages which may occur in the running of the shaft, which mechanism operates in conjunction with the registering mechanism A and is constructed as follows:

Upon a bearing-plate 7, (see Fig. 1,) fastened upon the support W within the case, are pivoted at 8 and 9, respectively, two levers B' and B². Plate 7 is further provided with two projecting studs or stops 10 and 11, which limit the play or throw of their respective levers B' and B². The short arm of lever B' projects rearwardly under and engages a tripping-lever $m$, which also has its fulcrum at $n$ upon the bearing-plate 7 and the long arm $n'$ of which projects into the registering mechanism A, where it is adapted to be tripped by a lug A', fastened upon and projecting from one of the wheels of the registering device. (See Fig. 15.) The corresponding end of the other lever B² is similarly (but without the intervening medium of a tripping-lever) adapted to be tripped by another stud or lug A², projecting from another of the wheels in the registering mechanism revolving in an opposite direction and at a higher rate of speed than the wheel having the tripping-lug A'. Near the outer end of the first lever B' is movably secured by means of a binding-screw a weight M', terminating in a sharp steel point, and in like manner is fastened upon the second lever B², near its outer end, a weight M², the lower end of which terminates in a chisel-point. Both levers B' and B² are made square in cross-section to adapt them to fit into square apertures in the pointed weights M' and M² for the purpose of preventing said weights from turning and hold them in their proper vertical working position parallel to each other.

From the foregoing it will be seen that the two levers B' and B² will be tripped at regular but varying intervals—lever B', for example, being tripped once to ten trippings or tiltings of lever B²; but these intervals may be longer or shorter, as desired.

The levers B' B² are preferably of spring metal, and when properly arranged for operation in conjunction with the record-strip carried by the drum the recording-points upon the weights are adjacent to but not in contact with the face of the strip. When thus disposed, the levers, when tripped, will by the momentum of the weights pass their normal position and the points will be driven into the record-strip, the rebound due to the spring of the lever returning the weights to the position above referred to—that is, adjacent to but not in contact with the strip. It is obvious that the slow but regular forward movement of the recording-drum can in no wise be hindered or impeded by the intermittent impact of the recording-points. The contact of the latter occupies no perceptible length of time. These levers, with their pointed weights or markers, operate in conjunction with the revolving recording-drum T, which is a flanged cylinder of metal or other suitable material, one of the flanges of which is toothed, so as to form a cog-wheel $t$. The periphery of the drum between the side flanges is covered with a strip of paper P', which by preference is backed by another strip of carbon-paper P², pasted upon a strip of soft muslin or other suitable textile fabric P³, and this compound recording-strip is ruled off longitudinally with parallel lines—one for each working-day in the week—which lines are crossed transversely by other equidistant lines—one for each hour of the day—and marked with the number of the hours from "1" to "12." (See Fig. 11.) The compound recording-strip, consisting of three layers—viz., a strip of white paper, a strip of carbon-paper, and a strip of textile fabric—after being cut off the proper length and width and ruled in the manner stated above is fastened upon and around the circumference of the drum, between its flanges, by inserting one end through a narrow slit T' and pasting the meeting ends together upon the drum. Any other way of fastening the recording-strip upon the drum may, however, be adopted, if desired.

The hub T² of the drum projects inwardly and has an interior screw-thread whereby it may be screwed upon the threaded spindle V, the inner end of which is reduced and turned cylindrical to form a tenon $v$, adapted to be inserted into and rest in a bearing in the back of the inclosing box or casing. The other or outer end of the threaded spindle is also turned cylindrical, as shown at V', and has a collar $o$, on the other side of which the projecting part is cut or filed off on opposite sides, so as to form a squared or rectangular bearing $p$, adapted to fit into a rectangular slot or bearing $q$ in a vertical standard-support W'. After the threaded journal or spindle has been inserted into its appropriate bearings $v'$ and $q$ it is fastened therein by means of a threaded cap $r$, which works upon the extreme outer end of the part V', (which is also threaded to receive and engage said cap,) the inner end of the cap bearing against a washer $s$, which, when the cap is turned in the proper direction by means of its finger-piece r', will bear up or press against the outside of the slotted bearing q in the fixed standard or drum-support W', when it will be seen that the threaded spindle is locked firmly in its place, the squared portion or bearing p preventing it from turning. At the same time it will be observed that the spindle with the drum upon it may readily be removed by loosening the cap r and washer s and withdrawing it from its bearings.

Inside of the casing and in proximity to the recording-drum T is mounted an eight-day clock H, of any approved construction, but, preferably, a so-called "marine clock" or clock without a pendulum, which is provided with any approved stop mechanism, the lever for operating which (shown at Y) is so placed as to be easily accessible when the door of the apparatus is opened. One of the power-wheels of the train of the clock is geared with a pinion 12, (see Figs. 2 and 7,) secured upon the shaft of another broad pinion 13, which engages the toothed rim t of the recording-drum T, thereby revolving the latter. The broad drum-pinion 13, together with its operating or actuating pinion 12, through which, as we have seen, isochronous motion is imparted from the clock, is journaled in a bearing or support 14, which is fastened by screws or in any other suitable manner upon the back frame of the clock-work, projecting rearwardly at right angles to the same in such a position that the teeth of pinion 13 will engage the teeth or cogs of the drum. Thus it will be seen that when the clock is set going it will (through the media of the pinions 12 and 13 and cog-wheel t) revolve the drum. The clock mechanism, and with it the drum T, may be stopped instantly and at any moment simply by pushing the projecting end of the stop-lever Y in the proper direction, while when this lever is moved to the opposite side the clock will start again and the drum resume its revolutions upon its fixed threaded journal or spindle V.

Having in the foregoing described the construction and combination of our improved automatic recording device, we shall now proceed to describe briefly its operation, which is as follows: Prior to the beginning of the week's work in the mill or factory (say seven o'clock Monday morning) the drum with a blank recording-strip properly fastened around it is arranged or "set" by screwing it upon its threaded spindle V and so turning it that the transverse line or mark upon the recording-strip marked with the numeral 1 and denoting the first day of the week shall be below and exactly aligned with the points on the markers M' and M². The hands of the clock (which has first been wound, but is prevented from going by the stop mechanism actuated by the lever Y) are then so adjusted as to point to seven o'clock, and precisely at that hour the clock is set going by pushing the stop-lever in the proper direction to allow the mechanism to run. Any delay in starting the main shaft, which is connected to the device and the speed, &c., of which is to be registered and permanently recorded, will be noted by the absence of pointer-marks upon the recording-strip; but the moment the shaft commences to revolve the two pointers M' and M² will commence to dot and mark the recording-strip, one M² with a row of fine dots following one another closely and in rapid succession and the other M' with a series of dashes transversely to the paper and parallel to one another, as clearly shown in Fig. 9 of the drawings, these dashes, however, being considerably wider apart than the dots, owing to the slower revolutions of the wheel which operates lever B'. As long as the shaft revolves regularly or with an even speed these dots and dashes will be at an even distance from one another; but any irregularities in the running of the shaft will be indicated by corresponding irregularities in the distribution of the dots and dashes on the recording-strip, and by looking at this the exact time when these irregularities occurred may be ascertained at a glance by means of the day and hour lines or divisions on the strip. The object in using two markers operated at different intervals instead of one is to make it easier to read off the marks and determine the duration of any irregularities or stoppages of the shaft, this being facilitated by the greater distances between the dashes. In this manner a permanent and absolutely reliable record is prepared of the running of the shaft, and by stopping the clock mechanism at any time and removing the drum this record may readily be inspected. At the end of the week and before starting on a fresh week's work the old record-strip is removed from the drum and preserved for future reference and a fresh strip is substituted, the clock meanwhile being stopped and set, as hereinbefore described, so as to commence recording of the next week's revolutions of the shaft in the same manner.

Having thus described our invention, we claim and desire to secure by Letters Patent of the United States—

1. The combination of the described registering mechanism, lever B', adapted to be actuated or tripped intermittingly by said mechanism, and lever B², also adapted to be tripped intermittingly by the registering mechanism, but at different intervals from lever B', said intervals representing given or stated time periods, substantially as and for the purpose set forth.

2. The combination, with the revolving recording-drum and its detachable recording-strip constructed and arranged as described, of the two recording-markers operating intermittingly in conjunction with each other and with the recording strip or slip, substantially in the manner and for the purpose set forth.

3. The combination of the revolving recording-drum having a central interiorly-threaded hub and toothed annular flange, the removable threaded shaft or journal having a plain tenon at one end and at the other a squared bearing and threaded projection, the washer, and the interiorly-threaded cap working upon said threaded projection and having a finger-piece for operating it, substantially as and for the purpose set forth.

In testimony that we claim the foregoing as our own we have hereunto affixed our signatures in presence of two witnesses.

SILAS H. POMEROY.
ALBERT M. WHITE.

Witnesses to Pomeroy's signature:
WILLIAM L. ADAM,
H. LAMENT.
Witnesses to White's signature:
C. CLIFFORD JAMES,
CHAS. W. GILLETTE.